July 5, 1949.  H. B. HOLTHOUSE, SR., ET AL  2,475,503
AUTOMATIC FLUID PRESSURE CONTROL SYSTEM
Filed Oct. 30, 1944  4 Sheets-Sheet 2
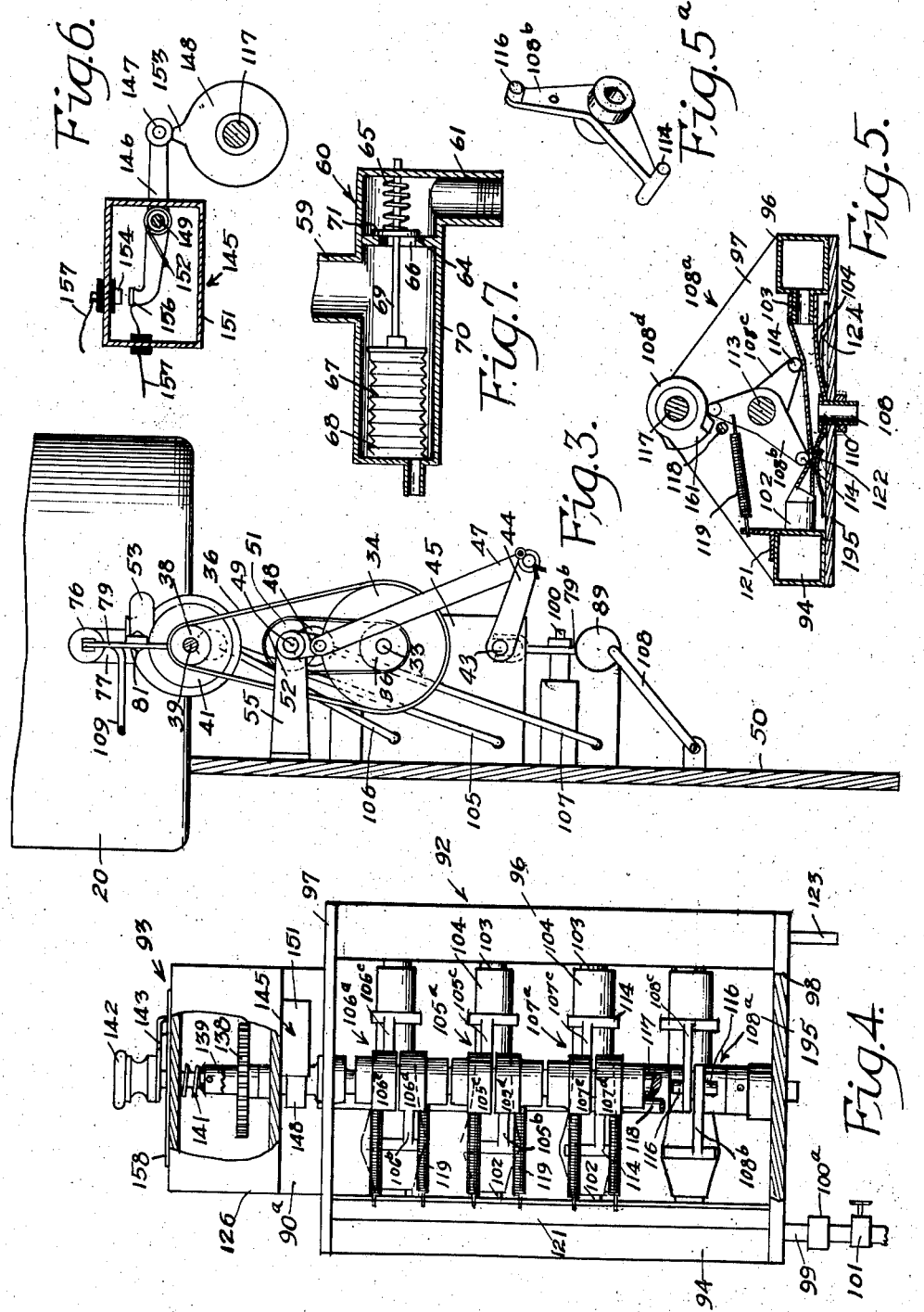
INVENTORS
HARRY B. HOLTHOUSE SR.
HARRY B. HOLTHOUSE JR.
by Rudolph L. Lowell att'y July 5, 1949.  H. B. HOLTHOUSE, SR., ET AL  2,475,503
AUTOMATIC FLUID PRESSURE CONTROL SYSTEM
Filed Oct. 30, 1944  4 Sheets-Sheet 3
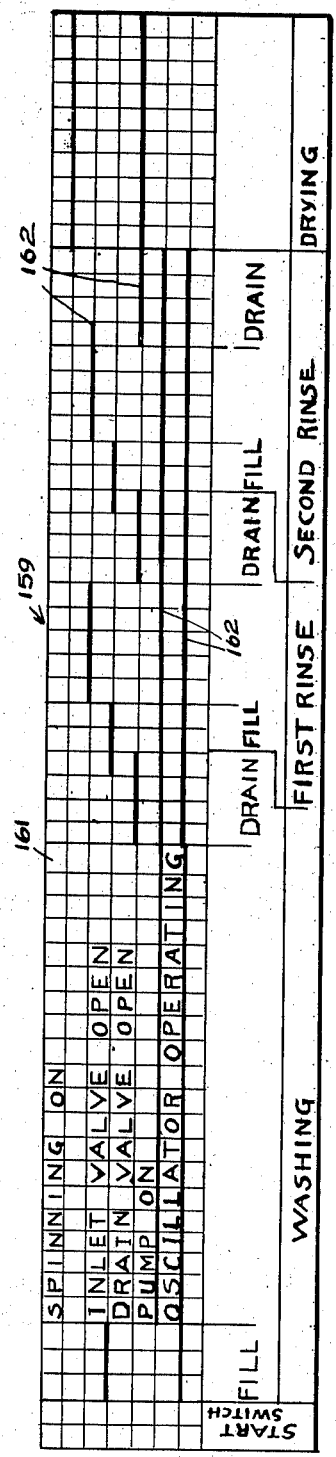
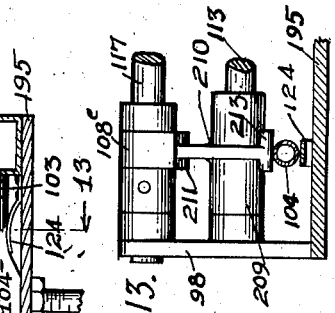
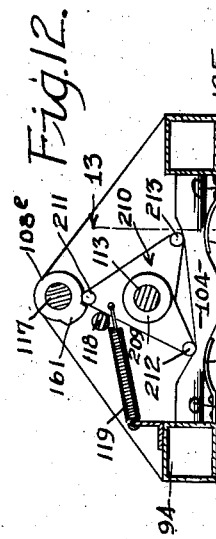
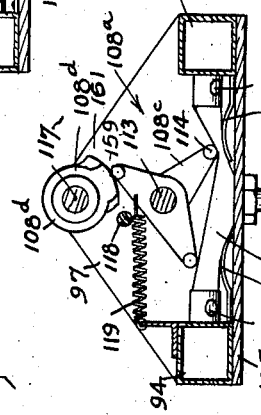
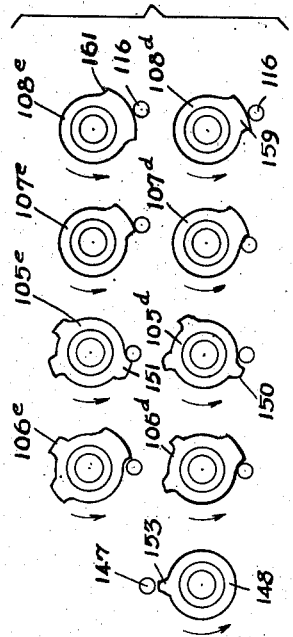
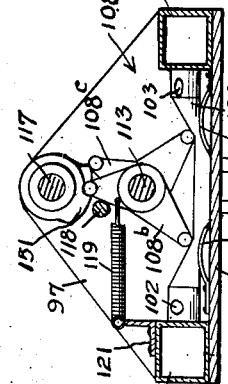
INVENTORS
HARRY B. HOLTHOUSE SR.
HARRY B. HOLTHOUSE JR.

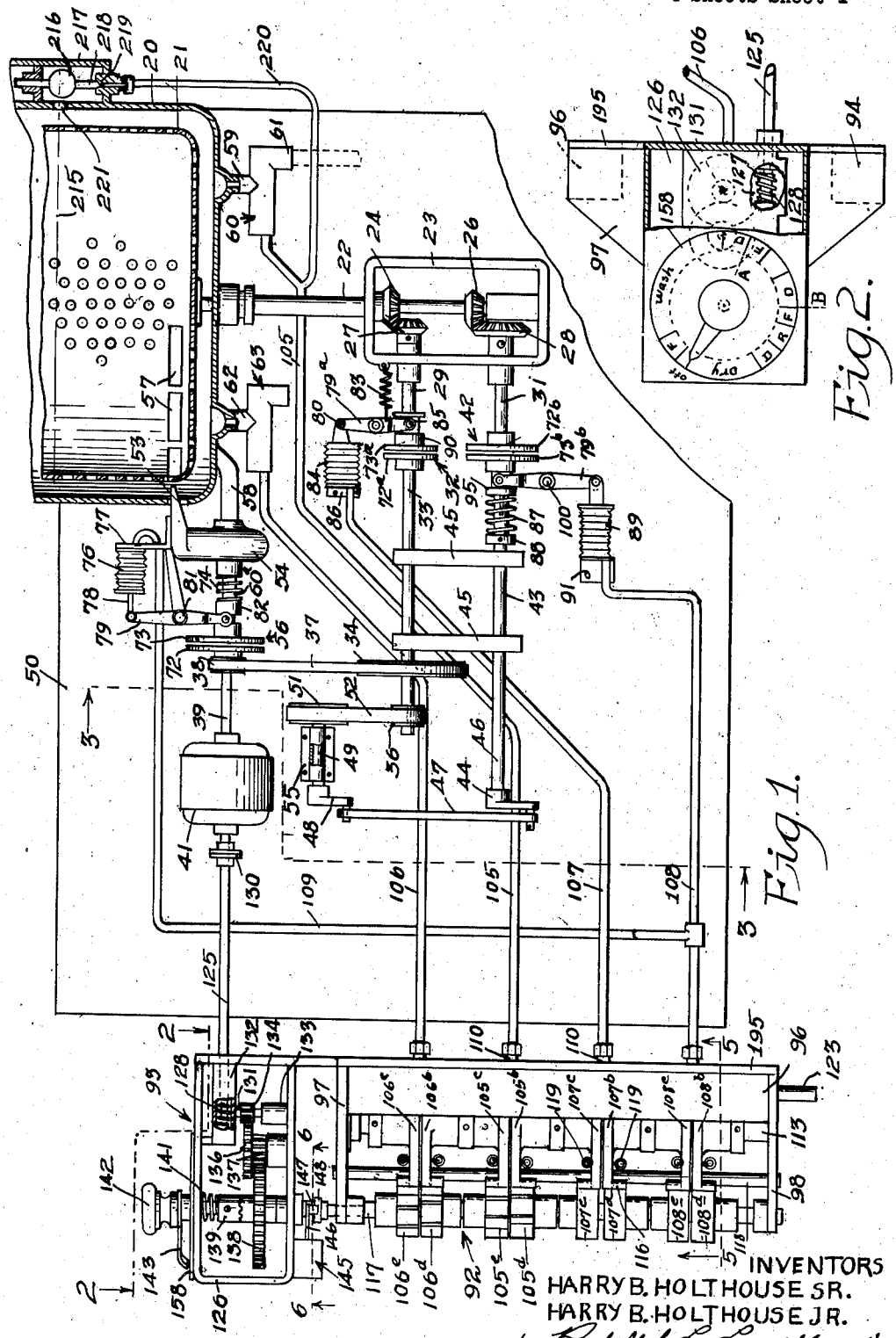

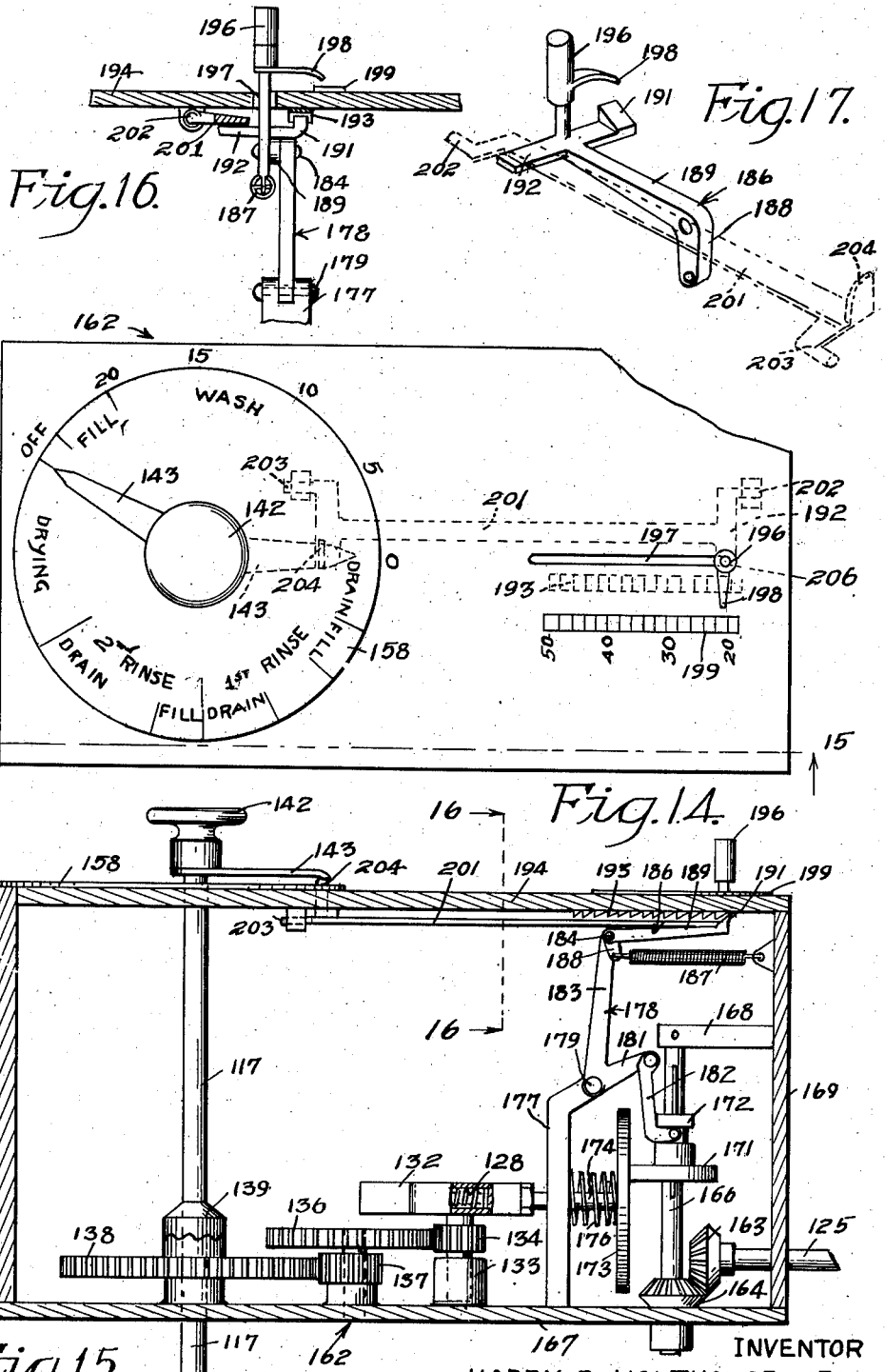

Patented July 5, 1949

2,475,503

UNITED STATES PATENT OFFICE 2,475,503

AUTOMATIC FLUID PRESSURE CONTROL SYSTEM

Harry B. Holthouse, Sr., and Harry B. Holthouse, Jr., Chicago, Ill.

Application October 30, 1944, Serial No. 561,136

3 Claims. (Cl. 60—97)

This invention relates generally to control systems and in particular to an automatic fluid pressure control system for clothes-washing machines, dish-washing machines or any machine wherein a cycle of operations is performed to effect a desired action on the material handled by the machine.

Control systems for machines of this type to automatically accomplish a cycle of sequential predetermined operations are well known and are usually of an electrical nature including actuating solenoids controlled with suitable switch devices. These systems are generally complicated and bulky and relatively expensive so as to appreciably increase the over-all cost of the machine to which they are applied. A further objection to devices of this kind is found in the fact that they are not completely flexible in adjustment or setting to provide for the ready performance of any one of a series of operations, within a predetermined cycle of operations, without generally being put out of adjustment to later provide for the proper performance of the cycle of operations. Yet another objection to electrical control systems in washing machines is in the danger of possible shocks to the machine operator, and the high cost of maintenance service on the electrical equipment due to dampness and corrosion.

It is an object of this invention, therefore, to provide an improved fluid pressure control system.

A further object of this invention is to provide an automatic hydraulic control system for a clothes-washing machine in which water at or below city main pressure is selectively applied to actuating devices for the operating units of the machine.

Another object of this invention is to provide an automatic hydraulic control system for a clothes-washing machine which can be operated with water pressures as low as five pounds per square inch.

Another object of this invention is to provide an automatic hydraulic control system which is capable of being quickly adjusted or set to provide for the performance of any one operation or a series of operations, within a cycle of operations, without effecting a performance of the remaining operations in such cycle.

A still further object of this invention is to provide an automatic hydraulic control system for a clothes-washing machine and the like which is relatively inexpensive in cost, comprised of parts which are of a like construction, compact in assembly, and capable of operating efficiently over long periods of time with a minimum of attention and adjustment.

A still further object of this invention is to provide an automatic hydraulic control system for a clothes-washing machine in which the time required for the washing period can be varied between wide limits within a predetermined angular distance of rotation of a rotatable pre-selector unit.

Yet another object of this invention is to provide an automatic hydraulic control system for a clothes-washing machine in which the pressure of the water supplied to the washing tub is selectively applied to actuate operating units in the machine in a pre-determined manner to effect a complete washing and drying action.

Yet another object of this invention is to provide an automatic fluid control system for a clothes-washing machine in which a control head may be located remotely from the operating units to be controlled.

A feature of this invention is found in the provision of an automatic hydraulic control system for a clothes-washing machine in which an electric operating motor for the machine is used as a timing means for a pre-selector unit adapted to selectively operate valve means in a fluid pressure system to control the application of the fluid pressure on pressure actuated devices for the operating units in the machine.

A further feature of this invention is found in the provision of an automatic hydraulic control system including a fluid pressure system having pressure actuated devices, and a city main as a source of fluid pressure supply, with the fluid system arranged to provide for the draining by gravity therefrom of any accumulated moisture.

Yet another feature of this invention is found in the provision of a control system for a clothes-washing machine having an operating motor, in which each operating unit in the machine is operatively associated with a fluid pressure actuating device connected with a source of fluid pressure such that the load to be carried by an operating unit is gradually applied on the motor to appreciably reduce any sudden overloading of the motor.

A still further feature of this invention is found in the provision of a fluid pressure control system in which the fluid pressure to be applied on an actuating device for an operating unit is controlled by means adapted to selectively squeeze closed a flexible conduit connecting the actuating device with a source of fluid pressure.

Further objects, features and advantages of this invention will become apparent from the following description when taken in connection with the accompanying drawings in which:

Fig. 1 illustrates schematically the hydraulic control system of this invention as applied to a clothes-washing machine;

Fig. 2 is a sectional view of the control head of the control system as seen along the line 2—2 in Fig. 1;

Fig. 3 is a sectional view taken along the line 3—3 in Fig. 1 showing the drive connection of the washing machine operating motor with a power transmission mechanism for the machine clothes receptacle;

Fig. 4 is an elevational view of the control head looking toward the right in Fig. 1;

Fig. 5 is a sectional view through a control valve which forms part of the control head, as seen along the line 5—5 in Fig. 1 with certain parts broken away to more clearly show the valve construction;

Fig. 5a is a perspective view of a rocker arm used in the valve shown in Fig. 5;

Fig. 6 is an enlarged sectional view taken on the line 6—6 in Fig. 1 showing a switch device, and actuating cam therefor, for the operating motor of the washing machine;

Fig. 7 is an enlarged detail sectional view of a control valve and actuating device therefor one of which is used for controlling the supply to, and another the draining of water from the washing machine tub;

Figs. 8 and 9 are illustrated substantially similarly to Fig. 5 and show the control valve in changed positions;

Fig. 10 illustrates schematically the relative arrangement and shape of the cams for operating the control valves in the control head;

Fig. 11 illustrates diagrammatically one of the time cycles available for the various clothes-washing and drying operations as controlled by the control system of this invention;

Fig. 12 illustrates a modified form of the control valve shown in Fig. 5;

Fig. 13 is a sectional view on the line 13—13 in Fig. 12;

Fig. 14 is a plan view of a modified form of control head;

Fig. 15 is a sectional view of the modified control head taken on the line 15—15 in Fig. 14;

Fig. 16 is a fragmentary sectional view as seen along the line 16—16 in Fig. 15; and Fig. 17 is a perspective view of the device for varying the clothes-washing period in the control head shown in Fig. 14.

The control system of this invention is illustrated in the drawings as applied to a clothes-washing machine having a rotatably supported clothes receptacle, which is oscillated during a clothes-washing operation and rotated at a relatively high speed during a clothes drying or water extracting operation. A tub surrounding the clothes receptacle is provided with a usual water inlet adapted to be connected to the supply line from a city main, and an outlet for draining water from the tub.

Both the tub inlet and tub outlet are provided with valves to control the supply and draining of water from the tub. A transmission mechanism is operatively associated with a pair of friction clutches selectively actuated to provide for either an oscillation or rotation of the clothes receptacle, with the transmission mechanism being connected with an electrical operating motor. The motor is also clutch-connectible with a centrifugal type pump which functions to produce the washing action within the clothes receptacle.

The control system for operating the above described operating units of the washing machine is of fluid pressure type and includes a control head, which may be located remotely from the washing machine, having a rotatable pre-selector unit operated in a timed relation by the operating motor for the washing machine. The control head includes a fluid pressure chamber or header connected with a usual city water main so that the fluid within the chamber is at a pressure maintained by the pressure of the water in the city main. The inlet and outlet valves for the wash tub, the clutch devices for connecting the motor driving shaft with the clothes receptacle power transmission mechanism, and the centrifugal pump, are each individually and operatively associated with a corresponding bellows unit. Each bellows unit in turn is individually connected through a conduit means with the fluid chamber in the control head.

Mounted in the control head is a series of valves corresponding in number to the conduit means for the bellows unit, and adapted to control the application of the fluid pressure from the fluid chamber to the bellows units. Each valve in the control head has an actuating rocker member. The pre-selector unit includes a cam shaft having cams mounted thereon corresponding in number to the actuating members for the valves. The operating motor for the washing machine is connected with the pre-selector unit such that the cam shaft is rotated through one revolution in the period of time required to perform a complete washing, rinsing, and water-extracting action on the clothes. The power for actuating the operating units in the washing machine is thus provided entirely by the utilization of the available water pressure in a usual city main, with the operating motor for the washing machine being used in the control system only as a source of power for operating the pre-selector unit in a timed relation.

Referring to the drawings the control system of this invention is shown in Figs. 1 and 3 as applied to a washing machine having a tub 20 and a clothes receptacle 21 formed with a perforated bottom and side walls. The receptacle 21 is mounted on an upright shaft 22 rotatably supported in a gear housing 23. Mounted on the shaft 22 within the gear housing 23 are a pair of axially spaced bevel gears 24 and 26 which are in meshing engagement with bevel gears 27 and 28 mounted on shafts 29 and 31, respectively. The shaft 29 is connected through a clutch device 32 to a shaft 33 which carries pulleys 34 and 36. The pulley 34 is connected through a belt 37 with a pulley 38 mounted on a shaft 39 of an electrical motor 41.

The shaft 31 is connected through a clutch device 42 with a shaft 43 having a rocker arm 44 mounted on its end 46. The free end of the rocker arm 44 is pivotally connected to one end of a link 47, the opposite end of which is rotatably supported on a crank arm 48 mounted at one end of a shaft 49. A pulley 51 is carried at the opposite end of the shaft 49 and connected through a belt 52 with the pulley 36 on the shaft 33. The shafts 33 and 43 are indicated in Figs. 1 and 3 as being rotatably supported in journal members 45 carried on a frame portion 50 of the washing machine. Shaft 49 is rotatably supported in a bearing 55 also mounted on the frame portion 50.

In the operation of the motor 41 a rotary movement is imparted to the shaft 22, and in turn to the clothes receptacle 21, on connection of the shafts 29 and 33 through the clutch device 32. To oscillate the clothes receptacle 21 the shafts 29 and 33 are disconnected and the shafts 31 and 43 connected through the clutch device 42. It is to be understood, of course, that the action of the clutch devices 32 and 42 is alternate, that is one clutch device is in an open position when the other clutch is in a closed position.

The oscillation of the clothes receptacle 21 takes place during the clothes-washing and rinsing operations. During these operations the clothes are agitated by water discharged from the outlet 53 of a centrifugal pump 54 having a shaft 60a connected with the shaft 39 of the motor 41 through a clutch device 56 (Fig. 1). The water from the pump outlet 53 is ejected into the clothes receptacle 21 through a series of slots 57 having an angular length which is equal substantially to the oscillatory travel of the clothes receptacle. The pump inlet 58 is connected to the bottom of the tub 20 so that the pump 54 functions to circulate the water through the tub 20 in a closed system. Water is supplied into the tub 20 through an inlet 59 having a control valve 60, with the inlet 61 to the control valve 60 being adapted for connection with a source of water supply for the washing machine, such as the usual city water main. An outlet 62 for draining water from the tub 20 is connected to the bottom of the tub and is provided with a control valve 63. The valves 60 and 63 for the tub inlet 59 and outlet 62, respectively, are of a like construction so that only the control valve 60 will be described in detail.

With reference to Fig. 7 the valve 60 is seen to include a casing 70 having a valve seat 64 therein with an orifice or opening 66 for communicating the valve inlet 61 with the tub inlet 59. A fluid pressure responsive actuating device located within the casing 70 is comprised of an expandible and contractible bellows unit 67 which is secured at its end 68 to the valve casing. The opposite end of the bellows 67 has an outwardly projected valve stem 69 extended through the orifice 66 and carrying a valve member 71 adapted for seating engagement with the seat 64. A spring 65 mounted on the valve stem 69 is arranged in compression between the valve member 71 and the valve casing 70 and normally retains the valve member 71 in seating engagement with the valve seat 64. Opening of the valve member 71 is accomplished by the bellows 67 in a manner which will be later explained.

The clutch devices, 32, 42 and 56 are of a like construction and similarly actuated by an associated fluid pressure responsive device so that only the clutch device 56 will be referred to in detail (Fig. 1). The clutch 56, which connects the pump 54 with the motor 41, includes a friction disc 72 mounted on the motor shaft 39 and a second friction disc 73 rotatable with the pump shaft 60a but axially movable on the pump shaft for movement into and out of frictional engagement with the disc member 72. Disc members 72 and 73 are normally held in a frictionally engaged position, to connect the shafts 39 and 60a, by a coil spring 74 mounted about the pumpshaft 60a and arranged in compression between a hub 82 for the disc member 73 and the housing of pump 54. The disc member 73 is moved out of frictional engagement with the disc member 72, to disconnect the shafts 39 and 60a, by a bellows unit 76 secured at one end to a bracket 77 which is supported on the pump housing. The other end of the bellows unit 76 has an outwardly projecting pin 78 pivoted to one end of a lever arm 79, which in turn is pivoted at 81 on the frame portion 50. The opposite end of the lever arm 79 is of yoke shape receivable in an annular groove formed in a hub 82 for the disc member 73. It is seen, therefore, that on expansion of the bellows unit 76 the disc member 73 is moved out of an engaging position with the disc member 72 by the lever arm 79 acting against the pressure of the spring 74.

The disc members 72a and 73a of the clutch device 32 for connecting the shafts 29 and 33 to impart a rotary movement to the clothes receptacle 21 are normally held out of frictional engagement by a tension spring 83 connected at one end to a pivoted lever arm 79a and at its opposite end to the gear casing 23. The lever arm 79a is pivoted on the frame portion 50 and is pivotally attached at one end 80 to the movable end of a bellows unit 84, the opposite end of which is mounted on a bracket 86 secured to the frame portion 50. End 85 of the lever arm 79a is of a yoke shape adapted to ride in an annular groove formed in a hub 90 for the disc member 73a.

The clutch device 42 for connecting the shafts 31 and 43 to oscillate the clothes receptacle 21 normally has its disc members 72b and 73b in a frictionally engaged position, which is retained by a coil spring 87 mounted about the shaft 43 and arranged in compression between a stop member 88 on the shaft 43 and the hub 95 of the disc member 73b. A pivoted lever arm 79b has its yoke end receivable in an annular groove formed in the hub 95 of the disc member 73b and its other end pivoted to the movable end of a bellows unit 89, the opposite end of which is attached to a bracket 91 mounted on the frame portion 50. The lever arm 79b is pivotally supported at 100 on the frame 50.

All of the bellows units 67, 76, 84 and 89 are of a like construction and expansible and contractible in response to a fluid pressure therein to operate an associated actuating unit, in a manner which will now be described.

A selective application of a fluid pressure to the bellows units to provide a pre-determined cycle of washing, rinsing and drying operations on the clothes in the receptacle 21, is accomplished by means including a pre-selector unit 92 formed as part of a control head, indicated generally at 93 in Fig. 1, and which control head may be located adjacent to or remotely from the washing machine mechanism.

The control head 93 comprises a fluid pressure header 94 and a waste or drain header 96 oppositely arranged on a base member 195 in a spaced relation between end frame members 97 and 98 (Figs. 1 and 4). Fluid is supplied to the header 94 under pressure through an inlet pipe 99 connected to any suitable continuous source of pressure supply such as the usual city water main. It is apparent, therefore, that the fluid in the header 94 is continuously maintained under pressure. The pipe 99 has a pressure regulating valve 100a and a valve 101 for controlling the pressure and supply of fluid to the header 94. The waste header 96 is provided with a drain pipe 123.

The header 94 is provided with a plurality of longitudinally spaced outlets 102 (Figs. 4 and 5) oppositely arranged from corresponding inlets 103 to the waste header 96. Each outlet 102 from the pressure header 94 is connected with a corresponding inlet 103 to the waste header 96 by a flexible tube connection 104 composed of rubber or a like material. Projected through the base member 195 in a longitudinally spaced relation are the ends 110 of conduits 105, 106, 107 and 108 corresponding in number to the flexible tubes 104, with the ends 110 being connected with an associated tube 104 in a substantially T connection, as illustrated for the end 110 of the conduit 108 in Fig. 5. The opposite ends of the conduits 105 and 106 are fluid connected with the bellows 67 in the valves 60 and 63, respectively, while the opposite ends of the conduits 107 and 108 are fluid connected with the bellows 84 and 89 for the clutch devices 32 and 42, respectively (Fig. 1).

The conduit 109 is connected at one end to the bellows 76 for the clutch device 56, and at its opposite end to the conduit 108 to provide for a concurrent actuation of the bellows 76 and 89 as will be later explained. The application of a fluid pressure from the header 94 to the conduits 105, 106, 107 and 108—109 is controlled by valve units 105a, 106a, 107a and 108a, respectively, each of which valve units includes a tube connection 104. Since each of the valve units 105a—108a is of a like construction, only the valve unit 108a will be described in detail.

Referring to Figs. 4 and 5 the valve unit 108a is shown as including a pair of rocker arms 108b and 108c mounted on a rock shaft 113 supported in the end frame members 97 and 98 in a parallel relation with the headers 94 and 96 and in alignment with, but spaced from, the projected ends 110 of the conduits 105–108, inclusive. The rocker arms 108b and 108c are of a like construction and only the arm 108b, therefore, will be described in detail.

As shown in Fig. 5a the rocker arm 108b is integrally formed at one end with a transversely extended cylindrical portion 114 of a length somewhat greater than the diameter of the tube connection 104. A pin 116 is projected laterally from one side of the rocker arm 108b at the opposite end thereof and constitutes a follower for a cam 108d mounted on a shaft 117, which is supported for axial and rotatable movement in the end members 97 and 98 and arranged in a parallel relation with the shaft 113.

In the assembly of the valve 108a the rocker arms 108b and 108c are reversely positioned adjacent each other on the shaft 113 so that their cylindrical end portions 114 are arranged at opposite sides of the shaft 113 and in turn to opposite sides of the projected end 110 of the conduit 108. Further, as best appears from Fig. 4, the followers 116 are extended in opposite directions for operative association with their respective cams 108d and 108e.

As shown in Figs. 1 and 4 the associated pairs of rocker arms 105b and 105c, 106b and 106c, 107b and 107c, and 108b and 108c for the valve units 105a–108a, inclusive, are longitudinally spaced in a stacked relation on the shaft 113. Likewise the cams 105d and 108d, and 105e and 108e, inclusive, are arranged in pairs in a stacked arrangement longitudinally of the shaft 117.

With reference to Fig. 10 it is seen that each associated pair of cams 105d and 105e through 108d and 108e, inclusive, are of a like construction except that the high spots on the cams 105e—108e are of a slightly longer angular length than the corresponding high spots on their associated cams 105d–108d, inclusive. In the assembly of each pair of cams on the shaft 113 the cams 105e–108e, inclusive are arranged so that their high spots overlap the high spots on their respective associated cams 105d–108d, inclusive. On rotation of the shaft 113 in the direction of the arrows shown in Fig. 10, the rocker arms 105c–108c, inclusive, are operated ahead of their corresponding rocker arms 105b–108b, inclusive, for a purpose which will become apparent in the following description of the operation of the valve unit 108a.

In the operation of the valve unit 108a the rocker arms 108b and 108c are normally held in a stopped position against a stop bar 118, supported in the end frame members 97 and 98 in a parallel relation with the shafts 113 and 117 by springs 119 connected at one end to a rocker arm 108b and 108c, and at their opposite ends to a bracket 121 carried on the pressure header 94 (Fig. 5). In this position the end portion 114 of the rocker arm 108b is pressed against the tube connection 104 so as to squeeze closed that portion of the tube 104 between the conduit end 110 and an outlet 102 for the pressure header 94. To assure a positive squeezing closed of the tube 104 there is provided on the base 195 a flat spring 122 at a position opposite from the zone of engagement of the tube 104 with the end 114 of the rocker arm 108b. The tube 104 is thus pinched between the rocker arm 108b and the spring 122, so as to shut off the supply of fluid from the pressure header 94 to the conduit 108.

The rocker arm 108c in its normal rest position against the stop rod 118 has the end portion 114 thereof in contact engagement only with the tube 104 so that the conduit 108 is open to the waste header 96. Arranged at the opposite side of the tube 104 from the end 114 of the rocker arm 108c is a second spring 124 which cooperates with the rocker arm 108c in all respects similar to the cooperative action between the rocker arm 108b and the spring 122.

On rotation of the shaft 117 in a counterclockwise direction, as viewed in Fig. 6, the high spot 161 on the cam 108e initially engages the rocker arm 108c to pinch or squeeze-close the tube connection 104 between the conduit end 110 and the waste header 96, as shown in Fig. 8. As a result the conduit 108 is initially closed from communication with both the pressure header 94 and the waste header 96. On a continued rotation of the shaft 117 the cam 108e continues to hold the rocker arm 108c in a tube-closing position concurrently with the action of the cam 108d to move the rocker arm 108b against the pressure of its associated spring 119 to an opening position for the tube 104, as shown in Fig. 9. The conduit 108 is thus closed by the squeezing of the tube 104 by the rocker arm 108b, from communicating with the inlet 103 to the waste header 96, and open to the outlet 102 of the pressure header 94. This relative position of the rocker arms 108b and 108c is retained for a predetermined period of time, depending upon the angular length of the high spot 159 on the cam 108d and the speed of rotation of the shaft 117, which period is sufficient to provide for a predetermined actuation of the bellows 76 and 89 which are connected with the conduit 108.

To release the fluid pressure in the conduit 108 the cam 108d initially provides for the return of the rocker arm 108b to its rest position, shown in Fig. 5. It is seen, therefore, that at no time is an outlet 102 in open communication with an inlet 103 to the waste header 96 so that there is no unnecessary waste of the fluid from the pressure header 94. In other words the fluid from the pressure header 94 is initially introduced into the conduit 108, and then released from the conduit 108 into the waste header 96, without at any time passing directly from the outlet 102 of the pressure header 94 into the inlet 103 of the waste header. This is accomplished by virtue of the fact that although the cams 105d—108d are of substantially the same shape as their corresponding cams 105e—108e, the high spots on the cams 105e—108e are of a greater angular length than the high spots on their corresponding cams 105d—108d. As a result in the operation of a valve unit, such as 108a, the closing and opening of the tube 104 by the rocker arm 108c overlaps the opening and closing of the tube 104 by the rocker arm 108b.

The valve units 105a–108a, inclusive, are selectively operated by the pre-selector unit 92 which includes the cams 105d–108d, and 105e–108e, both inclusive, and the cam shaft 117, which extends through the end frame member 97 and into a gear housing 126 attached to a reduced section 90a of the base member 195 (Figs. 1 and 4). The cam shaft 117 is driven by the motor 41, which constitutes a timing means for the pre-selector unit 92. Connection of the cam shaft 117 with the motor 41 is made through a gear train located in the gear housing 126 and including a worm gear 128 mounted on a flexible shaft 125 and operatively associated with a worm wheel 127 which is mounted on a shaft 131 rotatably supported at one end in a casing 132 for the gears 127 and 128 and at its opposite end in a bearing 133 formed on the gear housing 126 (Figs. 1 and 2). The flexible shaft 125 is connected with the motor shaft 39 through a coupling 130.

A gear 134 mounted on the shaft 131 is connected through gears 136 and 137 with a gear 138 rotatably supported on the cam shaft 117. The gear 138 has a serrated hub adapted for interlocking engagement with a serrated collar 139 fixed on the cam shaft 117 within the gear housing 126. The serrated collar 139 is normally held in locking position with the serrated hub of gear 138 by a coil spring 141 positioned about the cam shaft 117 and arranged in compression between the collar 139 and a side wall of the housing 126 so as to normally bias the shaft 117 downwardly as viewed in Fig. 1.

The cam shaft 117 is projected through the gear housing 126 and at its projected end carries a manual control knob 142 and an indicating pointer 143 which are keyed on the shaft 117. By manually gripping the control knob 142 the shaft 117 is axially movable upwardly, as also viewed in Fig. 1, against the pressure of the spring 141 a distance sufficient to disengage the serrated collar 139 from the hub of gear 138. With the shaft 117 manually held in such axially moved position the cam shaft 117 is manually rotatable independently of the gear 138 for a purpose which will appear later.

Operation of the motor 41 to drive the cam shaft 117 is controlled by a switch device 145 (Figs. 1 and 6) including a pivoted actuating lever 146 having a follower 147 operatively associated with a cam 148 mounted on the cam shaft 117. The lever 146 is pivoted on a shaft 149 mounted in the switch housing 151 and biased by a spring 152 so that the cam follower 147 is in following engagement with the cam 148. When the follower 147 is on the high spot 153 of the cam 148 switch contacts 154 and 156 are opened to in turn open an electrical circuit (not shown) for the motor 41 and including conductors 157. With the follower 147 off of the high spot 153 the contacts 154 and 156 are closed by the action of the spring 152 to close the circuit for the motor 41.

The control system is readily applicable to provide for the performance of any number of operations within a predetermined cycle of operations by merely varying the number of valve units in the control head 93 to correspond to the number of operating units in the machine to be controlled. It is understood, of course, that the number of pairs of cams in the preselector unit 92 will always correspond to the number of valve units in the control head 93. Thus although only four valve units 105a–108a, inclusive, are illustrated in Fig. 1, as included in the control head 93, this number is only shown by way of example of the application of the control system to a washing machine having the number of operating units illustrated in the drawings.

Let it be assumed that the cycle of operations to be performed corresponds to the operations indicated on the dial 158 in Fig. 14 which is similar in all respects to the dial 158 shown in Fig. 1 on the gear casing 126 for the pointer 143. From a consideration of the dial 158 in Fig. 14 it is seen that the cycle of operations includes a washing operation, two rinsing operations, and a drying or water-extracting operation. The cam shaft 117 in the pre-selector unit 92 is operated at a speed of one revolution per hour, which speed is accomplished by knowledge of the pre-determined rate of speed of the motor 41, and a proper determination of the gears connecting the motor shaft 39 with the cam shaft 117. By virtue of this speed of operation of the cam shaft 117 it is apparent that the cam shaft, and in turn the cams mounted thereon, will be rotated through an angular distance of 6° each minute. The time period required for each operation, in the cycle of washing operations, can thus be indicated directly on the dial 158.

It is well known, of course, that many of the operations within the cycle of operations to be performed for a desired washing of the clothes in the receptacle 21 take place concurrently and in an overlapping relation. In order, therefore, that the cams 105d—108d, and 105e—108e, properly provide for the proper occurrence of the various operations, a time cycle of these operations may be indicated on a chart 159 shown in Fig. 11.

In the chart 159 each square 161 longitudinally of the chart designates a minute, so that the chart in effect is a developed view of a cylindrical time chart contemplated to be rotated through one revolution per hour. The various operations to be performed, and corresponding to the operations designated on the dial 158, are indicated in vertical columns, varying in width according to their time periods of operation, with the operations being listed vertically adjacent the left-hand end of the chart. The horizontal heavy lines 162 indicate the length of time for each operation and the relation of one operation with respect to the remaining operations in the cycle of washing operations.

From the chart 159 the angular length of the high spot or operating portion of the cams 105d–108d, and 105e–108e, both inclusive, can be computed directly in degrees by merely determining the minutes required for an operation and multiplying this number of minutes by 6°. Thus for example referring to the chart, it will be noted that the drain valve 63 is opened three separate times during the complete cycle of operations. The cams 105d and 105e operatively associated with the drain valve 63 are formed with three high spots angularly spaced, with the high spots on the cam 105d having angular lengths computed from the chart 159, and the high spots on the cam 105e having angular lengths adapted to overlap the actuating periods of the cam 105d in the manner above explained.

In the operation of the system assume the pointer 143 to be at the "off" position indicated on the dial 158 in Fig. 2. The control knob 142 is manually gripped and axially extended to disengage the serrated collar member 139 from the hub of gear 138 and rotated in a clockwise direction, as viewed in Fig. 2, until the pointer 143 is at the beginning of the "fill" operation, indicated as "F" on the dial 158, for the washing operation. This rotation of the knob 142 in turn rotates the cam shaft 117 and the cam 148 to operate the switch 145 for the motor 41. Thus on release of the manual knob 142, the serrated members 139 and 138 are automatically engaged and the system conditioned to automatically provide for the performance of all the operations within the cycle of operations indicated on the dial 158, and with the washing operation taking place for the maximum length of time of twenty minutes indicated on the dial 158.

Where a washing period of less than twenty minutes is wanted the knob 142, on completion of the washing fill operation, is lifted upwardly and rotated in a clockwise direction to a desired minute mark on the dial 158. It is apparent, of course, that a washing period of less than twenty minutes may be obtained by a single actuation of the knob 142 by the provision of additional high spots on the fill cams 105d and 105e at positions corresponding to the five minute markings on the dial 158 for washing period.

Since the operation of each valve 105a–108a, inclusive, in the control head 93 and its control of a corresponding bellows unit is similar in all respects only the operation of the valve 108a will be fully described.

With reference to Fig. 1 it is seen that the valve 108a is operatively associated through the conduit 108 with the bellows unit 89 which actuates the clutch device 42 to control the oscillatory movement of the clothes receptacle 21; and through conduits 109 and 108 with the bellows 76 for actuating the clutch device 56, which connects the pump shaft 60a with the motor shaft 39.

From a consideration of Fig. 11 it is seen that the receptacle 21 is oscillated and the pump 54 operated during the initial filling of the tub 20 and the later following and successive washing and two rinsing operations. The filling of the tub 20 is controlled by the high spots 150 and 151 on the cams 105d and 105e, respectively, to supply a fluid pressure through the conduit 105 to the bellows 67 of the tub inlet valve 60 for a period of three minutes corresponding to a rotation of the cam shaft 117 through 18°.

It is apparent, of course, that the rate at which the tub 20 is filled depends upon the pressure of the water in the city main, but a time period of three minutes is generally sufficient to fill the tub to its level indicated at 270 in Fig. 1 at a usual city main pressure of about twenty pounds per square inch. However, in order to limit the water to the level 215 at pressures in excess of the usual twenty pound per square inch pressure there is provided a float valve including a float 216 located in a housing 217 carried on the outside of the tub 20 substantially at the level 215. The housing is fluid connected with the tub 20 through an aperture 221 in the tub wall at the level 215. Suspended from the bottom of the float 216 is a valve member 218 adapted to seat in a valve seat member 219 threaded in the bottom of the housing 217 and acting as a guide for the valve member 218. A bleeder conduit 220 is connected at one end to the conduit 105 and at its opposite end to the valve seat member 219.

When the water in the tub 20 reaches the level at 215 the float 216 lifts the valve member 218 away from its seat in the member 219 whereby water from the conduit 105 is bled to the conduit 220 and into the tub 20 through the housing 217 and opening 221. This bleeding of water from the conduit 105 reduces the water pressure acting on the bellows 67 of the inlet valve 60, whereby the bellows 67 is permitted to contract to in turn provide for a seating of the valve 71 on the seat 64 to close the inlet valve 60. It is seen, therefore, that the float valve acts as a pilot control for the inlet valve 60 to close the valve 60 even though the valve 105a is actuated by the cams 105d and 105e to supply water in the conduit 105. On completion of the three minute interval for the initial tub fill the valve 105a will be actuated by the cams 105d and 105e to close the supply of water to the conduit 105 and in turn the further bleeding of water through the conduit 220 into the tub 20.

The oscillation of the receptacle 21 and operation of the pump 54 during the initial tub fill, the washing and two rinsing operations is accomplished by virtue of the fact that the disc members 72b and 73b, of the clutch 42, and disc members 72 and 73 of the clutch 56 are normally held in frictional engagement by the action of the springs 87 and 74, respectively. During the initial tub fill, and later washing and two rinsing operations, therefore, the low spots on the cams 108d and 108e, as shown in Fig. 10, are rotated past the ends 116 of the rocker arms 108b and 108c, respectively. The valve 108a is thus maintained in its normal rest position shown in Fig. 5 during the time the initial tub fill, washing and two rinsing operations are taking place, so that no fluid pressure is admitted into the conduits 108 and 109.

On completion of the second rinsing operation the high spots 159 and 161 of the cams 108d and 108e, respectively engage the ends 116 of the rocker arms 108b and 108c, respectively, to operate the valve 108a to its position shown in Fig. 9. Water is thus supplied into the conduits 108 and 109 for application on the bellows 89 and 76.

The water admitted into the conduit 108 expands the free end of the bellows 89 to the right, as viewed in Fig. 1, to pivot the lever arm 79b in a counter-clockwise direction, as also viewed in Fig. 1, to in turn move the disc member 73b, against the pressure of the spring 87, out of frictional engagement with the disc member 72b. The opening of the clutch device 42 takes place substantially concurrently with the closing of the clutch device 32 by the valve unit 107a so that the receptacle 21 is substantially immediately rotated to perform a drying operation as indicated in the chart 159 (Fig. 11). Since the conduit 109 is connected with the conduit 108 it is apparent that the bellows 76 will be operated concurrently with the bellows 89 to operate the clutch device 56 and stop the operation of the pump 54.

The clutch devices 42 and 56 are held open, during the drying operation, by the bellows 89 and 76, respectively, for a period of time corresponding substantially to the angular length of the high spot 159 on the cam 108d. When the cam high spot 159 passes out of an engaging position with the end 116 of the rocker arm 108b the pressure header 94 is closed from communication with the conduit 108. On disengagement of the end 116 of the rocker arm 108c with the high spot 161 of the cam 108e the conduits 108 and 109 are opened to the waste header 96 whereby to release the pressure in the conduits 108 and 109. By virtue of this pressure release in the conduits 108 and 109 the bellows 76 and 89 are contracted by the action of the springs 74 and 87, respectively, whereby to provide for a concurrent closing of the clutch devices 56 and 42, respectively.

It is believed that the operation of the remaining bellows by their corresponding valves in the control head 92 will be apparent from the above detailed description of the valve unit 108a, so that a detail description of their operation is believed to be unnecessary.

With reference to the chart 159 in Fig. 11, it is seen that the tub outlet or drain valve 63 is held open three different times during a complete cycle of operations, i. e., to empty the tub 20 following the washing operation and each of the two rinsing operations. The operation of the valve 63 in this manner is accomplished by the provision of three angularly spaced high spots, on the cams 106d and 106e (Fig. 10) in a relation providing for a desired actuation of the valve 106a to properly control the application and discontinuance of a fluid pressure on the bellows 67 of the valve 63. It is to be understood, of course, that the control action of the float 216 will have precedence over the control action of the cams 106d—106e for all tub filling operations.

Similarly the cams 105d and 105e are each formed with three angularly spaced high spots to provide for a predetermined opening of the inlet valve 60 preceding the washing operation, and the two rinsing operations. It will be noted in Fig. 11 that the "fill" operation before each "rinse" is in an overlapping relation with a preceding "drain" operation. This is for the purpose of flushing the tub 20 before it is filled with clean water.

The spinning operation is controlled by the actuation of the valve 107a by the cams 107d and 107e so that pressure is applied on the bellows 84 for the clutch device 32 during the drying operation when the clutch devices 42 and 56 are in their open positions. It will be noted that the drain valve 63 is retained open during the drying operation so that all moisture removed from the clothes by spinning the perforated receptacle 21 is immediately drained from the tub 20.

On completion of the drying operation all of the valves 105a–108a, inclusive are returned to their normal rest positions, as shown for the valve 108a in Fig. 5, so as to close all of the conduits 105–108, inclusive, from communication with the pressure header 94. Following the return of the valves 105a—108a to their normal positions the high spot 153 on the cam 148 for the switch device 145 actuates the lever arm 146 to open the contacts 154 and 156 to stop the operation of the motor 41. The complete cycle of washing operations is thus automatic and may be repeated by initially manually actuating the knob 142 in the manner above explained.

It is seen, therefore, that the motor 41 is utilized in the control system only as a timing means for driving the preselector unit 92. By virtue of the slow rate of operation of the cam shaft 117 the power taken for this purpose from the motor 41 is very small and in the neighborhood of one foot pound per hour. All of the power for operating the inlet valve 60, drain valve 63, and clutch devices 32, 42 and 56 is provided by the pressure of the fluid admitted to the pressure header 94. Although the source of fluid supplied to the chamber 94 has been described as coming from a usual city water main, it is to be understood that it may be supplied by any other suitable means such as an independent pumping system or the like. It is apparent, also, that the system will operate efficiently whether the fluid admitted to the header 94 is water, air, or a combination of the two, and that it may also be operated with a suction pressure in the pressure header 94 by a slight modification in the lever system connecting the bellows units 89, 86 and 76 with their corresponding clutch devices 42, 32 and 56, and by reversing the action of the bellows 67 relative to the valve member 71, in the tub valves 60 and 63.

The system has been found to operate efficiently and satisfactorily over a pressure range in the header 94 of between five and thirty-five pounds per square inch whereby it can be used in localities or cities having different pressures in their water mains. When pressures of five pounds per square inch are used the various bellows may be increased in size, relative to their size for higher pressures in the neighborhood of about twenty pounds per square inch, so as to effectively actuate their corresponding operating units.

The provision of a pressure-actuated control system for a washing machine or the like also provides for a smoother starting of the operating units in the machine. Thus for example with reference to the operation of the clutch device 42 by the control valve 108a it is apparent that a lag will occur between the operation of the valve 108a and the operation of the clutch device 42 to either stop or start the oscillatory movement of the clothes receptacle 21. This lag period occurs by virtue of the time required for the fluid pressure in the chamber 94 to build up within the conduit 108 and the bellows unit 89. Also this pressure build-up is gradual so that the frictional engagement between the disc members 72b and 73b takes place progressively to a maximum frictional engagement as determined by the pressure within the header 94. Due to the frictional engagement between the disc members 72b and 73b taking place gradually slippage may occur between the disc members so that any sudden overloading of the motor 41 is entirely eliminated, as is also any sudden changes in the movement of the receptacle 21 from an oscillatory to a spinning operation, and from a standstill to an oscillating operation. It is further apparent that not only is the application of the pressure from the header 94 gradually applied on the bellows, but the maximum pressure to be applied can be regulated by merely varying the desired maximum pressure in the header 94 through the pressure regulating valve 100a. As a result both the maximum fluid pressure, and its rate of application on the bellows and in turn on the actuating units in the machine can be varied over relatively wide limits, dependent upon any desired condition of operation, by controlling the valve 101 in conjunction with the pressure regulating valve 100a. Likewise, it is apparent that the time period required for a pressure build-up in the various bellows can be varied over wide limits, depending upon particular operating conditions to be met. Further the rate of application and magnitude of the fluid operating pressure can be independently controlled relative to each bellows by varying the size of the conduit associated with a bellows.

Further the system is capable of accomplishing the performance of a series of operations within the cycle of operations independently of the remaining operations in the cycle. This is due to the time lag which takes place in the building up of a pressure in a conduit 105—108 equal to the pressure in the header 94 on actuation of a control valve 105a—108a. Thus assume that the first rinse operation is to be eliminated. On completion of the washing operation the knob 142 (Fig. 2) is manually raised and the pointer 143 rotated from a position at A to a position at B covering an angular distance normally required for the first rinsing operation. The manual rotation of the pointer 143 and in turn of the shaft 117 is at a relatively fast rate, compared to the normal rotation of the shaft at one revolution per hour, so that the cams 105d and 105e, and 106d and 106e, for the valves 105a and 106a, respectively, which control the valves 60 and 63, respectively, pass into and out of engagement with the rocker arms in these valves at a speed such that the pressure head 94 is in communication with the conduits 105 and 106 for a time insufficient to permit a pressure build-up in these conduits capable of actuating the bellows 67 in the valves 60 and 63, respectively. As a result the valves 60 and 63 are not operated on manual rotation of the pointer to skip the first rinsing operation. In like manner any one or more operations can be omitted from the cycle without any actuation of the operating units, which would be actuated in a normal running of the cycle.

As shown in Fig. 1 the control head is in an upright position with the drain pipe 123 for the waste header 96 at its bottom. Also all of the conduits 105-109, inclusive, are located substantially below the level of their corresponding bellows and stepped down to the waste header 96. When the system is at rest, therefore, all of the fluid therein is drained by gravity flow into the waste header and out of the system through the drain pipe 123.

The control head 93, as described above, provides for the performance of a plurality of operations in a predetermined cycle, and with all of the operations taking place within at least a one hour period. Referring to the dial 158 in Figs. 2 and 14 it is seen that the washing operation is variable between a time period of from zero to twenty minutes, with the twenty minute time period corresponding to a rotation of the pointer 143 and in turn of the cam shaft 117 through an angular distance of 120°. It is, of course, well known that the length of the washing period varies for different kinds of clothes and for badly soiled clothes as compared to slightly soiled clothes.

Referring to Figs. 14 through 17, inclusive, there is shown a modified form of control head which provides for the extension of the washing operation for longer time periods than twenty minutes, and within the 120° angular travel of the cam shaft 117 normally required for a twenty minute washing operation. Since the modified control head is similar in most respects to the control head 93 in Fig. 1 similar numerals of reference will be used to designate like parts.

A set of worm gears 127 and 128, and gears 134—138, cam shaft 117, manual knob 142, pointer 143 and dial 158 are operatively assembled with a gear casing 162 in a manner similar to the assembly of the like parts with the gear casing 126 as described in connection with Fig. 1. The flexible shaft 125 carries a bevel gear 163 which is in meshing engagement with a bevel gear 164 mounted on a shaft 166 rotatably supported in the gear casing side wall 167 and in a bearing member 168 projected inwardly from the gear casing side wall 169 (Fig. 15). Rotatable with the shaft 166, and axially movable thereon, is a friction gear 171 having a hub portion 172. The periphery of the friction gear 171 is frictionally engageable with the side face of a friction gear 173 mounted on a shaft 174 which also carries the worm 128. The gears 171 and 173 are retained in frictional engagement by a coil spring 176 mounted about the shaft 174 and arranged in compression between the gear 173 and a frame member 177 in the gear housing 162.

Movement of the gear 171 axially of the shaft 166 to a changed position relative to the face of the gear 173 is accomplished by means including a bell crank 178 pivoted at 179 on the frame member 177. The free end of the bell crank arm 181 is pivoted to a yoke member 182 which rides freely in an annular groove formed in the hub 172 of the friction gear 171. The free end of the arm 183, of the bell crank 178, is pivoted at 184 to a second bell crank 186. A tension spring 187 is connected at one end to the arm 188 of the bell crank 186 and at its opposite end to the side wall 169 of the gear casing 162, for a purpose which will be later explained.

The free end of the arm 189 of the bell crank 186 is formed with a pawl portion 191 and a projection 192 which are extended in opposite directions laterally of the arm 189 (Figs. 15, 16 and 17). The pawl 191 is operatively associated with a ratchet bar 193 carried on the inner surface of the gear housing side wall 194. An upright finger grip 196 is positioned on the arm 189 substantially between the pawl 191 and the projection 192 and extends through a slot 197 in the gear housing side wall 194 which is in a parallel relation with the ratchet bar 193. A pointer 198 extended laterally from the finger grip 196 is associated with a linear dial 199 carried on the outside surface of the side wall 194 in a parallel relation with the slot 197. The dial is graduated in minute markings ranging from twenty to fifty.

An elongated bar 201, parallel with the slot 197, is pivoted at its ends 202 and 203 to the inside of the gear housing side wall 194 (Figs. 14 and 16). The bar 201 is supported against downward movement by the projection 192, so that the projection 192 is slidably movable on the under side of the bar 201 as shown in Figs. 16 and 17. Adjacent the end 203 of the bar 201 is an upright projection 204 which is extended through an opening in the gear housing side wall 194 and dial 158 for engagement with the pointer 143.

In the operation of the control head in Figs. 14 through 16, let it be assumed that a washing period between zero and twenty minutes is desired. The finger grip 196 is moved against the end 206 of the slot 197, to in turn move the crank arms 186 and 178 to adjust the friction gear 171 relative to the friction gear 173, to one operating position which shall be termed the "normal" position and provides for a speed of rotation of the cam shaft 117 of one revolution per hour. This normal position, shown in Fig. 15, is retained by the action of the spring 187 which holds the finger grip 196 against the slot end 206. With the finger grip 196 in stop engagement against the slot end 206 a washing period of anywhere from zero to twenty minutes is accomplished by adjusting the pointer 143 relative to the dial 158 in the manner above explained in connection with the control head 93 in Fig. 1.

Now assume that a washing period of longer than twenty minutes is desired, such for example a washing period of forty minutes. This washing period is obtained by moving the finger grip 196 until the pointer 198 is at the forty minute marking on the linear dial 189. This movement of the finger grip 196 moves the bell crank 186 to the left as viewed in Fig. 15 to a position corresponding to the forty minute washing period, which position is retained by the pawl 191 engaging the ratchet bar 193. The movement to the left of the bell crank 186 in turn rotates the bell crank 178 in a counter-clockwise direction, and the yoke 182 upwardly, as also viewed in Fig. 15, whereby the friction gear 171 is moved upwardly, from its normal position shown in Fig. 15, toward the periphery of the friction gear 173. This movement of the friction gear 171 relative to the friction gear 173 reduces the speed of rotation of the friction gear 173 in a manner which is believed to be apparent. By a proper determination of the relative sizes of the friction gears 171 and 173 relative to the minute markings on the dial 199, a speed of rotation of the cam shaft 117 is provided at which forty minutes will be required to rotate the cam shaft 117 through the 120°, or twenty minute period, allotted to the washing operation on the dial 158.

Near completion of the washing operation the pointer 143 engages and depresses the upright projection 204 on the bar 201 to in turn pivot the bar 201 in a clockwise direction, as viewed in Fig. 16, to depress the projection 204 and move the pawl 191 out of engagement with the ratchet bar 193. With the pawl 191 disengaged from the ratchet 193 the projection 192 is slidably moved relative to the bar 201, by the action of the spring 187, until the finger grip 196 is returned to its position against the end 206 of the slot 197. Concurrently with the movement of the finger 196 against the slot end 206 the friction gear 171 is moved downwardly to its normal position shown in Fig. 15. The gears, on completion of the washing operation, thus provide for a rotation of one revolution per hour for the remainder of the operations to be performed in the cycle.

It is to be understood, of course, that the minute indications on the dial 199 are supplementary to the minute indications on the dial 158 so that the pointer 143 is always set at the zero marking on the dial 158 after the pointer 198 has been set to a minute marking on the dial 199 greater than twenty minutes. As a result of the adjustment of the friction gears 171 and 173 a wide variation in the time period required for a washing operation can be accomplished within a predetermined angular rotation of the cam shaft 117.

With reference to Figs. 12 and 13 there is shown a modified form of rocker arm 210 adapted to be used in the valves 105a–108a, inclusive, in place of the rocker arms 105b—108b and 105c— 108c, shown in Fig. 1. When the rocker arm 210 is used the cams 105d—108d are eliminated and only the cams 105e—108e are employed. For the purpose of clarity of description the rocker arm 210 in Figs. 12 and 13 will be described relative to its substitution for the rocker arms 108b and 108c in the valve 108a, so like numerals of reference, therefore, will be used for corresponding parts in Figs. 5, 8 and 9.

The rocker arm 210 is of a substantially triangular shape having a hub 209 at its central portion for mounting on the rocker shaft 113. The three apexes of the rocker arm are provided with arcuate shaped portions 211, 212 and 213 for engaging the cam 108e, the tube 104 adjacent a pressure header outlet 102, and the tube 104 adjacent a waste header inlet 103, respectively. A spring 119 connected at one end to the bracket 121 and at its other end adjacent the portion 211 holds the rocker arm 210 in a normal rest position, shown in Fig. 12, at which the portion 212 pinches the tube 104 closed adjacent the outlet 102, while the portion 213 is out of a tube-closing position.

With the rocker arm 210 in its normal position the conduit 108 is closed from the outlet 102 and open to the inlet 103 for the waste header 96.

On rotation of the cam shaft 117 in a counter-clockwise direction, as viewed in Fig. 12, the high spot 161 on the cam 108e engages the portion 211 and rocks the arm 210 in a clockwise direction, as also viewed in Fig. 12, to move the portion 212 out of a tube-pinching position and the portion 213 into a tube-pinching position. The conduit 108 is thus opened to the pressure header 93 and closed from the waste header 96.

It is apparent that during the movement of the portion 211 from the low spot of the cam 108e to its high spot 161 both of the portions 212 and 213 will be concurrently out of tube pinching positions. As a result the pressure header outlet 102 will be open to both the conduit 108 and the waste header inlet 103. However, since the time interval required for the movement of the portion 211 to a top position on the cam high spot 161 is relatively short very little water will be wasted by virtue of the tube 104 being open over its entire length by the concurrent actuation of the portions 212 and 213 by the cam 108e.

From a consideration of the above description it is seen that the invention provides a hydraulic control system operated from the available water pressure in a city main and capable of automatically controlling a washing machine or the like to perform a predetermined cycle of operations. The system is flexible in application to actuate any number of operating units in the machine and provides for the performance of a series of operations within the cycle of operations, without producing the performance of the remaining operations in the cycle, and capable of varying the time period of an operation over relatively wide limits. Further the system may be operated with pressures ranging from a low pressure in the neighborhood of five pounds per square inch to a high pressure of about thirty-five pounds per square inch by merely changing the bellows 67, 76, 84 and 89 to a desired cross sectional area commensurate with the available pressure to effectively actuate their corresponding operating units.

Although the invention has been described with respect to several preferred embodiments thereof it is to be understood that it is not to be so limited since changes can be made therein which are within the full intended scope of this invention as defined by the appended claims.

We claim:

1. A fluid pressure system for controlling the operation of a plurality of operating units in a predetermined timed relation within a complete cycle of operations, including a control head, a cam shaft rotatably supported in said control head, a timing means for continuously rotating said cam shaft in one direction through one revolution during a complete cycle of operations of said operating units, a plurality of cams on said cam shaft corresponding to said operating units, a fluid header in said control head having a constant fluid pressure therein, a pressure responsive actuating unit operatively associated with each of said operating units, a plurality of single fluid carrying members connected between said header and each of said actuating units, and valve units in said control head for controlling the supply of the fluid from said header to a corresponding fluid carrying member, with said valve units corresponding to said cams and being operatively associated therewith.

2. A fluid pressure control system providing for the selective operation of a plurality of operating units within a predetermined cycle of operations including a fluid chamber having a pressure therein, a pressure responsive actuating device operatively associated with each operating unit, means fluid connecting each said devices with said fluid chamber, a valve means for each said connecting means to control the supply of said fluid pressure from said chamber to a corresponding one of said devices, actuating means for each said valve means, means for selectively operating said valve means including a cam shaft, means supporting said cam shaft for rotatable and axial movement, cams on said shaft corresponding to said actuating means and operatively associated therewith, drive means for continuously rotating said cam shaft in one direction in a time period required for said cycle of operations, and means for connecting and disconnecting said shaft with said drive means, said last mentioned means being movable to a disconnecting position on axial movement of said shaft in one direction, said shaft, when in said axially moved position being rotatable independently of said drive means to position said cams to provide for the operation of a selected series of operations in said cycle of operations.

3. A control system providing for the selective operation of a plurality of operating units to perform a cycle of predetermined operations including an actuating device individual to each operating unit, means for selectively operating said actuating devices including a rotatable cam unit, means intermediate said cam unit and actuating devices for operating said actuating devices and operatively associated in a controllable relation with said cam unit, driving means for rotating said cam unit through a revolution in a time period required to complete said cycle of operations, means for varying the time period of one of the operations in said cycle of operations including a friction drive connection between said cam unit and driving means comprising a first rotary friction member, and a second rotary friction member having its peripheral surface frictionally engageable with a side face of said first friction member, means movably supporting said second friction member for movement across the side face of said first friction member, tension means for moving said second friction member in one direction to a normal operating position relative to said first friction member, manually operated means for moving said second friction member to an adjusted position in an opposite direction, and means rotatable with said cam unit engageable with said manually operated means, on completion of said one operation, to release the second friction member from said adjusted position for movement to said normal position.

HARRY B. HOLTHOUSE, Sr.
HARRY B. HOLTHOUSE, Jr.

REFERENCES CITED

The following references are of record in the file of this patent:

UNITED STATES PATENTS

| Number | Name | Date |
| --- | --- | --- |
| 1,799,113 | Miedbrodt | Mar. 31, 1931 |
| 1,999,439 | Braun | Apr. 30, 1935 |
| 2,225,407 | Bassett | Dec. 17, 1940 |
| 2,228,700 | Hamner et al. | Jan. 14, 1941 |
| 2,241,807 | Cotner | May 13, 1941 |
| 2,252,800 | Daniels | Aug. 19, 1941 |
| 2,388,662 | Anderson | Nov. 13, 1945 |

FOREIGN PATENTS

| Number | Country | Date |
| --- | --- | --- |
| 489,791 | Great Britain | Aug. 4, 1938 |